United States Patent
Blumenschein

(10) Patent No.: US 9,169,144 B2
(45) Date of Patent: Oct. 27, 2015

(54) HIGH RATE CHEMICAL SOFTENING PROCESS

(71) Applicant: Veolia Water Solutions & Technologies Support, Saint-Maurice (FR)

(72) Inventor: Charles D. Blumenschein, Pittsburgh, PA (US)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 238 days.

(21) Appl. No.: 13/900,575

(22) Filed: May 23, 2013

(65) Prior Publication Data

US 2013/0313201 A1 Nov. 28, 2013

Related U.S. Application Data

(60) Provisional application No. 61/651,798, filed on May 25, 2012.

(51) Int. Cl.
   *C02F 1/52* (2006.01)
   *C02F 1/42* (2006.01)
   (Continued)

(52) U.S. Cl.
   CPC ... *C02F 5/02* (2013.01); *B01D 9/00* (2013.01); *B01D 21/01* (2013.01); *C02F 5/08* (2013.01);
   (Continued)

(58) Field of Classification Search
   CPC ........ C02F 1/52; C02F 1/5209; C02F 1/5227; C02F 1/5245; C02F 1/5263; C02F 1/5272; C02F 1/54; C02F 1/56; C02F 1/42; C02F 9/00; C02F 2001/007; C02F 2001/422; C02F 2001/425; C02F 2001/5218; C02F 2301/08; C02F 2305/12; C02F 5/00; C02F 5/02; C02F 5/08; C02F 5/083; C02F 5/10; B01D 9/00; B01D 9/0059; B01D 21/01

USPC ........ 210/663, 669, 702, 703, 714, 723, 726, 210/727, 728, 732, 804
See application file for complete search history.

(56) References Cited

U.S. PATENT DOCUMENTS 4,765,913 A * 8/1988 Featherstone ................. 210/714
6,919,031 B2 * 7/2005 Blumenschein et al. ..... 210/711
(Continued)

FOREIGN PATENT DOCUMENTS

WO          0236500 A2       5/2002

OTHER PUBLICATIONS

"Wastewater Technology Fact Sheet—Ballasted Flocculation." United States Environmental Protection Agency. 8 pp. 2005_07_28_mtb_ballasted_flocculation.ptf.

*Primary Examiner* — Joseph Drodge
(74) *Attorney, Agent, or Firm* — Coats and Bennett, PLLC

(57) ABSTRACT

A ballasted flocculation system that chemically softens water and causes hardness particles to precipitate from the water and crystallize. In the course of crystallizing, the hardness particles grow and form ballasted floc that are separated from the water in the form of sludge by a clarification unit, producing a clarified effluent. The separated sludge including the hardness crystals is directed to a separator where the sludge is separated into two streams with each stream having hardness crystals contained therein. In one process design, one stream includes relatively small hardness crystals and the other stream includes relatively large hardness crystals. The stream having the relatively small hardness crystals is directed to a first reactor and mixed with the incoming water and a softening reagent. The stream having the relatively large crystals is directed to a second downstream reactor and mixed with water and a flocculant which facilitates the growth of the hardness crystals.

10 Claims, 1 Drawing Sheet

(51) Int. Cl.
   *C02F 1/56*   (2006.01)
   *C02F 9/00*   (2006.01)
   *B01D 9/00*   (2006.01)
   *B01D 21/01*  (2006.01)
   *C02F 5/02*   (2006.01)
   *C02F 5/08*   (2006.01)

(52) U.S. Cl.
   CPC ............ *C02F 9/00* (2013.01); *C02F 2001/5218* (2013.01); *C02F 2301/08* (2013.01); *C02F 2305/12* (2013.01)

(56) References Cited

U.S. PATENT DOCUMENTS

| | | | |
|---|---|---|---|
| 7,311,841 B2* | 12/2007 | Binot et al. | 210/666 |
| 7,608,190 B1* | 10/2009 | Banerjee et al. | 210/663 |
| 7,695,630 B2* | 4/2010 | de Guevara | 210/709 |
| 7,815,804 B2* | 10/2010 | Nagghappan | 210/638 |
| 8,147,695 B2 | 4/2012 | Banerjee | |
| 8,349,188 B2* | 1/2013 | Soane et al. | 210/666 |
| 8,834,726 B2* | 9/2014 | Keister | 210/726 |
| 8,853,641 B2* | 10/2014 | Mazzillo | 250/372 |
| 8,945,394 B2* | 2/2015 | Kincaid et al. | 210/710 |

* cited by examiner

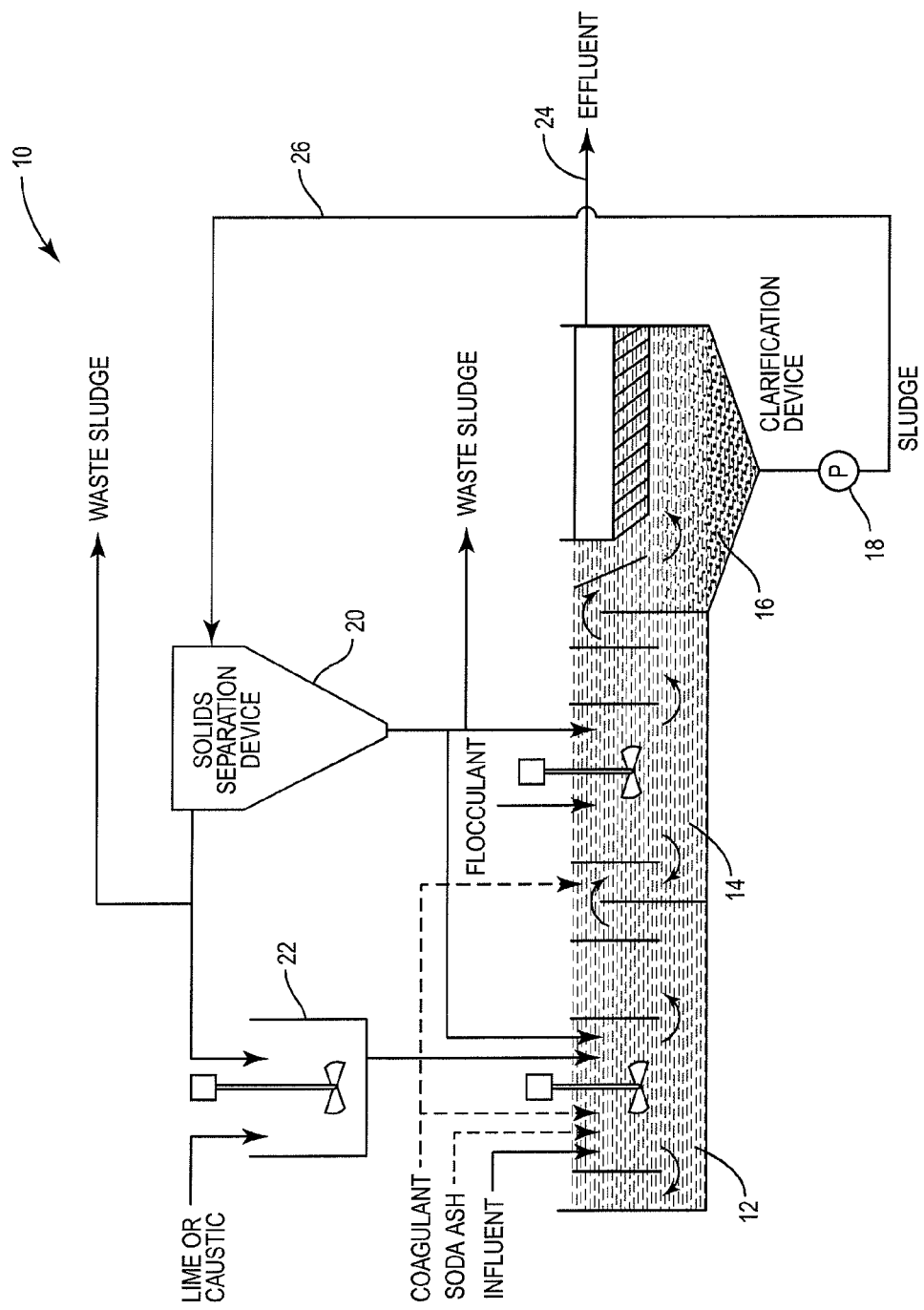

HIGH RATE CHEMICAL SOFTENING PROCESS

This application claims priority under 35 U.S.C. §119(e) from the following U.S. provisional application: Application Ser. No. 61/651,798 filed on May 25, 2012. That application is incorporated in its entirety by reference herein.

FIELD OF THE INVENTION

The present invention relates to softening processes and more particularly, to a chemical softening process carried out in a ballasted flocculation system.

SUMMARY OF THE INVENTION

The present invention relates to a high rate softening process where a softening reagent is mixed with water being treated. Hardness particles precipitate from the water and form crystals. The hardness crystals are suspended solids produced by the process. The solids are separated from the water, producing a clarified effluent. The solids are directed to a solids separation device which separates the solids into two streams with each stream containing hardness crystals. In one embodiment, the process utilizes first and second reactors. In this embodiment, one solids stream is directed to one reactor and the other solids stream is directed to the second reactor. In both cases, the reactors include mixers that mix the hardness crystals with the water being treated, which further encourages the crystallization of precipitated hardness particles.

In one process design, the solids separation device separates the solids into a first stream having relatively small hardness crystals and a second stream having relatively large hardness crystals. The first solids stream is mixed with the softening reagent and water in the first reactor while the second stream having the relatively large hardness crystals is mixed with the water in the second downstream reactor. Hardness particles precipitated in the first reactor begin to crystallize. Water, along with hardness crystals, is transferred from the first reactor to the downstream second reactor where the hardness crystals continue to grow. Mixing the relatively small hardness crystals in the first reactor and the relatively large hardness crystals in the second reactor promotes an orderly and efficient crystallization process that is effective in facilitating the removal of hardness and suspended solids from the water.

In another embodiment, the high rate softening process can be implemented without the use of sand. Here the hardness crystals grow and effectively form a ballast. When the clarifying unit employed is a settling tank, these relatively large crystals can be used as ballasts that, when used with flocculants, may attract hardness, non-hardness precipitants and other suspended solids and which will settle relatively fast in the settling tank. This increases the efficiency of removing hardness, other precipitants, and suspended solids from the water.

Other objects and advantages of the present invention will become apparent and obvious from a study of the following description and the accompanying drawings which are merely illustrative of such invention.

BRIEF DESCRIPTION OF THE DRAWINGS

FIG. 1 is a schematic illustration of the high rate softening process of the present invention.

DESCRIPTION OF EXEMPLARY EMBODIMENTS

The present invention entails a process for softening water in a ballasted flocculation system which can be carried out without using sand as a ballast. A softening reagent, such as lime, caustic and/or soda ash, is mixed with water having hardness. This results in hardness particles, such as calcium carbonate, precipitating. The process of the present invention is designed to encourage certain hardness particles to crystallize, resulting in the hardness particles growing into relatively large crystals. These relatively large crystals containing hardness particles settle relatively fast in a settling tank provided in one embodiment of the present invention. To promote hardness crystal growth and efficient hardness removal, these hardness crystals are recovered and returned to the mainstream where they are mixed with the water being treated. In one example, as explained below, the settled solids or sludge recovered in the settling tank which contains the hardness crystals and other suspended solids is directed to a solids separation unit that separates the solids into a sludge stream having relatively small hardness crystals and a sludge stream having relatively large hardness crystals. In this example, the system includes first and second reactors. The sludge stream having the relatively small hardness crystals is directed to the first reactor where the relatively small hardness crystals are mixed with the softening reagent or reagents and the water being treated. The small hardness crystals act a seed to promote the growth of larger hardness crystals in the first reactor. This process encourages the rapid growth of hardness crystals. The sludge stream having the relatively large hardness crystals is mixed with the water and a flocculant in the second downstream reactor. The large hardness crystals act as a ballast to which smaller particles and other suspended solids can attach and thereby form a floc that contains various contaminants that are targeted for removal from the water being treated.

Turning to FIG. 1, a high rate chemical softening system is shown therein and indicated generally by the numeral 10. As seen in FIG. 1, the system includes a first reactor or tank 12 and a second downstream reactor or tank 14. Both of these reactors can be fitted with draft tubes to enhance mixing. Downstream of the second reactor 14 is a clarification unit 16 which, in the case of the embodiment disclosed, is a settling tank. As will be discussed, sludge settles to the bottom of the settling tank and a pump 18 is utilized to pump the sludge and the solids contained therein via line 26 to a solids separation device 20. Solids separation device 20 can assume various forms. It may include a sophisticated solids separation device such as a hydrocyclone, but for the purposes of the present invention, the solids separation device can be of a simple design, such as a swirl concentrator, elutriator or a conical bottomed tank. Solids separation device 20 produces two sludge streams, one stream directed to a mixing tank 22 and another stream directed back to the second reactor 14. As illustrated in FIG. 1, portions of each sludge stream can be wasted.

Now turning to the process of the present invention, the system 10 is designed to soften or remove hardness from water. The influent wastewater that is treated by the system shown in FIG. 1 typically contains hardness, mainly in the form of calcium and magnesium. Other forms of hardness, such as strontium, barium, iron, and manganese, may be present. Generally, the goal in a typical softening process is to convert calcium and magnesium compounds to calcium carbonate and magnesium hydroxide precipitants.

In the case of one embodiment, the present invention envisions mixing lime, either hydrated lime ($CaOH_2$) or quicklime (CaO) with the water to be treated. Lime can be mixed with the water directly in tank 12 or, as shown in FIG. 1, the lime can be mixed with one of the sludge streams produced by the solids separation device 20 in the mixing tank 22 and that mixture is directed into the first reactor 12. Either approach will work. In some cases, a coagulant such as a ferric salt can be added to the water, in either tank 12 or 14, for the purpose of destabilizing suspended solids and precipitants. However, in the case of the process depicted in FIG. 1, it is believed that a coagulant is unnecessary because of the relatively large amounts of solids that are present in the system.

Mixing lime with the water will result in the lime preferentially reacting with carbon dioxide and bicarbonates to cause calcium carbonate to precipitate as calcium carbonate particles. This ordinarily occurs at a pH of approximately 10 to approximately 10.3. Once the carbon dioxide demand has been met, the lime is free to react with calcium bicarbonate, for example, which further results in the precipitation of calcium carbonate particles. Calcium bicarbonate is typically the most common calcium compound found in untreated water but other calcium-based hardness compounds have similar reactions. Magnesium compounds have a slightly different reaction. Generally, magnesium bicarbonate reacts with lime and produces calcium carbonate and magnesium carbonate. Then the magnesium carbonate reacts with lime and creates more calcium carbonate and magnesium hydroxide. Both of these compounds precipitate out of water.

In some cases, it may be desirable to remove non-carbonate hardness. As an option, soda ash can be mixed with the water in the first reactor 12. Non-carbonate hardness compounds will have slightly different reactions. In the case of magnesium sulfate, for example, lime first reacts with magnesium sulfate to form magnesium hydroxide, which will precipitate out of solution, and calcium sulfate. The calcium sulfate then reacts with soda ash ($NaCO_3$), producing calcium carbonate and sodium sulfate.

Other softening processes can be employed. For example, depending on the chemistry of the influent wastewater, a caustic such as sodium hydroxide can be used in combination with soda ash to precipitate hardness. It should also be noted that where the influent wastewater includes a considerable concentration of sulfate, softening processes as described above will precipitate calcium sulfate.

The process of the present invention is designed to encourage the precipitated hardness particles, particularly calcium carbonate particles, to crystallize. As will be discussed later, downstream processes that recycle solids facilitate and promote the crystallization of hardness particles and other solids in the water.

When lime is mixed with the water in reactor 12, this causes hardness particles to precipitate and the mixing action in reactor 12 allows the hardness particles to crystallize and grow in size. It is contemplated that the calcium carbonate particles precipitating in reactor 12 and those returned to reactor 12 will grow. This is facilitated by the continuous mixing of the water and hardness crystals in the reactor 12 and particularly the mixing in the draft tube contained therein The purpose of the draft tube is to facilitate and encourage the continued crystal growth in reactor 12, sometimes referred to as primary nucleation. Primary nucleation of the crystals should occur in the first reactor 12. The reaction time in tank 12 can vary but in one embodiment reaction time should be relatively short. For example, the reaction time in reactor 12 may be only approximately 5 to approximately 10 minutes. In one embodiment, the process may not drive the softening chemistry to completion in reactor 12. In other cases, the softening chemistry may be completed in the first reactor 12.

It is recognized that some hardness particles may not readily crystallize to the extent of others, such as calcium carbonate. For example, magnesium hydroxide particles will not significantly crystallize and, hence, throughout the process will assume very fine particle sizes.

Water from reactor 12, along with hardness particles, is transferred to the second downstream reactor 14. There a flocculant is mixed with the water as well as solids from the solids separation device 20. The nature of the solids from the solids separation device 20 that are mixed with the water in the second reactor 14 will be subsequently discussed. In some cases, the softening chemistry may not have been completed in reactor 12 and, thus, the softening reactions continue until completion in reactor 14. In reactor 14 the hardness crystals continue to grow. This is facilitated by the continuous mixing of the water, flocculant and hardness crystals in the reactor 14 and particularly the mixing in the draft tube contained therein. The purpose of the draft tube is to facilitate and encourage the continued crystal growth in reactor 14, sometimes referred to as secondary nucleation.

In the second reactor, the hardness crystals become relatively large compared to the crystals in the first reactor 12. As the crystals grow larger, they form ballasts. The formation of ballasts plus the use of flocculants results in other suspended solids agglomerating around the ballasts to form floc. These floc are relatively heavy and, hence, settle fast. While the residency time in the second reactor 14 may vary, it is contemplated that, in one embodiment, the residency time of the water in the second reactor can be relatively short, on the order of approximately 5 to approximately 10 minutes.

Water and solids from reactor 14 are directed into a clarifying unit which, in the example shown in FIG. 1, is a settling tank 16. There the solids, including the hardness crystals, settle to the bottom of the settling tank 16. Because the hardness crystals have grown and are relatively large and heavy, their settling speed is relatively fast. The settling of the sludge produces a clarified effluent that is directed from settling tank 16 via line 24.

Settled sludge in the bottom of tank 16 is pumped by pump 18 through line 26 to the solids separation device 20. As noted above, the solids separation device 20 can assume various forms and does not require a highly precise separation device. In one embodiment, the solids separation device divides the sludge into two streams, a first stream and a second stream. The second sludge stream having hardness crystals contained therein is directed from the solids separation device 20 into reactor 14. Here the second sludge stream, including the hardness crystals, is mixed with the water and existing crystals in this reactor. The addition of the hardness crystals from the solids separation device 20 act as ballast and facilitates and encourages the further growth and secondary nucleation of the hardness crystals in reactor 14. From time-to-time or continuously some of the sludge being directed from the solids separation device 20 in to the second reactor 14 should be wasted. By wasting sludge, hardness in the form of hardness crystals and other contaminants are effectively removed from the water being treated.

The first sludge stream produced by the solids separation device 20 is directed to the mixing tank 22. The first sludge stream is mixed with a softening reagent which could be lime, soda ash or caustic, for example. As noted above, the mixing tank 22 is not essential inasmuch as the first sludge stream and the softening reagent could be directed into the first reactor 12 without being mixed in the mixing tank 22. In any event, the first sludge stream including hardness crystals and other solids is mixed together in the mixing tank 22 and then the mixture is directed into the first reactor 12. Again, it may be advisable to waste some sludge from the first sludge stream. Thus, as shown in FIG. 1, there is a waste sludge line that branches off the line that directs the first sludge stream to the mixing tank 22.

In another embodiment, the solids separation device 20 may be operated such that it effectively divides the hardness crystals or hardness particles into two groups, one group containing a majority of relatively small hardness particles or crystals and a second group containing a majority of relatively large hardness particles or crystals. The demarcation line may vary and it is expected that in practice there would be at least some relatively large and small particles in each group. However, in one example, the solids separation device could be operated such that the intent would be to separate the hardness particles and crystals into one group where a majority of the particles or crystals was less than 50 microns in size and the other group would include a size greater than 50 microns. In this exemplary embodiment, the sludge stream having a majority of relatively small particles or crystals is directed to the mixing tank 22 and, after being mixed with the softening reagent, is directed into the first reactor 12. By directing relatively small hardness particles or crystals to the first reactor 12, particle growth is promoted. The sludge stream having a majority of relatively large hardness particles or crystals is directed into the second reactor 14 and mixed with the water, flocculant, and existing hardness particles or crystals therein. These larger particles act as ballast and assist in the formation of larger floc to promote settling. This process also facilitates and promotes the continued growth of hardness crystals and the secondary nucleation process. It should be noted that even in this process some of the hardness particles, such as magnesium hydroxide particles, may not undergo a significant crystallization process. As such, magnesium hydroxide particles in the stream directed to the mixing tank 22 would be relatively small. These fines are wasted via the waste sludge line that leads from the line extending between the solids separation device 20 and the mixing tank 22.

Thus, it is appreciated that the present invention entails a process where hardness particles are precipitated from the water and, through a crystallization process, these particles grow and form crystals as they move from reactor 12 to and through reactor 14. The process further entails recovering these crystals and recycling them to upstream points in the process to further facilitate and promote the growth of hardness crystals which, in the end, because of their high settling rate, is an efficient means of removing hardness and other suspended solids from the wastewater being treated.

There are numerous advantages to the process described herein as compared to conventional softening processes. The level of total suspended solids that can be recycled and fed to the clarification unit 16 is much higher than can typically be achieved with conventional processes. It is hypothesized that the total suspended solids directed to the clarification unit 16 would be as high as 10,000 mg/L and higher. In conventional ballasted flocculation processes that utilize sand as a ballast, there is concern for "post-precipitation" of solids onto the sand. In the case of the present process, the process encourages "post-precipitation" of solids onto the recycled sludge. The concepts embodied in the present process allow for smaller reaction tanks as compared to conventional ballasted flocculation processes, for example. This is because in conventional designs for a sand ballasted process, the reactors are typically designed to allow for complete precipitation of solids prior to the addition of sand.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of treating water including chemically softening the water, producing hardness crystals, and forming the hardness crystals into ballasts to facilitate the removal of suspended solids from the water, the method comprising:
   chemically softening the water by mixing a softening reagent with the water in a first reactor and precipitating hardness particles in the first reactor and in a downstream second reactor;
   directing the water and hardness particles from the first reactor to the second reactor;
   crystallizing at least some of the hardness particles in the second reactor to form hardness crystals;
   directing the water and hardness crystals to a clarification unit downstream of the second reactor and separating the hardness crystals from the water to produce a clarified effluent;
   directing the hardness crystals from the clarification unit to a separator and separating the hardness crystals, by size, into a first stream where a majority of the hardness crystals are relatively small and a second stream where a majority of the hardness crystals are relatively large;
   mixing the first stream and the hardness crystals therein with the softening reagent and water in the first reactor;
   mixing the second stream and the hardness crystals therein with the water in the second reactor where the hardness crystals grow;
   forming at least some of the hardness crystals in the second reactor into ballasts;
   removing suspended solids from the water by agglomerating the suspended solids, with the aid of a polymeric flocculant, around the ballasts formed by the hardness crystals to form ballasted floc; and
   separating the ballasted floc from the clarified effluent in the clarification unit.

2. The method of claim 1 wherein a majority of the hardness crystals in the first stream are less than 50 microns in size and wherein a majority of the hardness crystals in the second sludge stream are greater than 50 microns in size.

3. The method of claim 1 wherein the ballasted flocculation process for softening water is carried out in the absence of sand.

4. The method of claim 1 wherein hardness precipitation from the water occurs in both the first and second reactors.

5. The method of claim 4 wherein the water is retained in the first reactor for a time period of approximately five minutes to approximately ten minutes.

6. The method of claim 1 wherein chemical softening reactions involving softening reagent occur in both the first and second reactors.

7. The method of claim 1 wherein primary nucleation of the hardness crystals occurs in the first reactor.

8. The method of claim 7 wherein secondary nucleation of the hardness crystals occurs in the second reactor.

9. The method of claim 1 including wasting a portion of the second sludge stream.

10. The method of claim 1 including wasting a portion of both the first and second sludge streams.

* * * * *